United States Patent [19]
Satoh et al.

[11] Patent Number: 5,293,566
[45] Date of Patent: Mar. 8, 1994

[54] INFORMATION RECORDING AND REPRODUCING APPARATUS

[75] Inventors: Isao Satoh, Neyagawa; Yoshihisa Fukushima, Osaka; Yuji Takagi, Hirakata; Yasushi Azumatani, Neyagawa; Hiroshi Hamasaka, Nishinomiya, all of Japan

[73] Assignee: Matsushita Electric Industrial Co., Ltd., Osaka, Japan

[21] Appl. No.: 749,603

[22] Filed: Aug. 26, 1991

[30] Foreign Application Priority Data

Aug. 28, 1990 [JP] Japan .................... 2-227027

[51] Int. Cl.⁵ .................................................. G11B 7/00
[52] U.S. Cl. ........................................................ 369/49
[58] Field of Search ...................... 369/32, 48, 49, 14, 369/59

[56] References Cited

U.S. PATENT DOCUMENTS 5,034,914 7/1991 Osterlund ........................... 364/32
5,132,853 7/1992 Kulakowski et al. ............... 369/59

*Primary Examiner*—Donald E. McElheny, Jr.
*Attorney, Agent, or Firm*—Wenderoth, Lind & Ponack

[57] ABSTRACT

An information recording and reproducing apparatus includes a rewritable optical disc having a plurality of sectors on which data can be rewritten. The rewritable optical disc is divided into an additionally recordable region in which the data are additionally recorded and a rewritable disc control region in which an address of a latest recorded sector in the additionally recordable region is recorded. The optical disc is used as an additionally recordable optical disc in which recording is permitted only one time and reproduction can be performed plural times. The information recording and reproducing apparatus further includes a control circuit for recording data on unrecorded sectors in the additionally recordable region and for reading the data from recorded sectors. This control circuit can rewrite and reproduce data in the disc control region. The control circuit reads the disc control region prior to additional recording of data, thereby finding a first unrecorded sector from the address of the latest recorded sector recorded in the disc control region. Furthermore, the control circuit records data on unrecorded sectors following the first unrecorded sector, and upon termination of data recording, the address of the latest recorded sector in the disc control region is rewritten.

8 Claims, 4 Drawing Sheets

Fig. 4
| TYPE OF DISC | SPEED | TYPE OF MODU. | ECC | REFLEC-TANCE | .... |
24
31 — WORM/REWRIT. TYPE
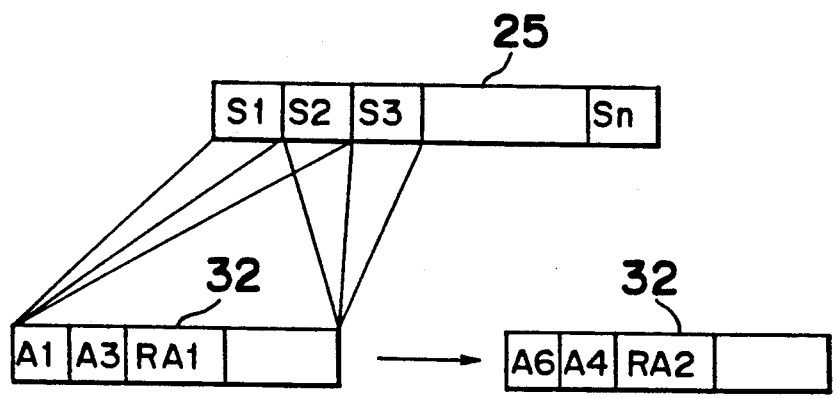
Fig. 5
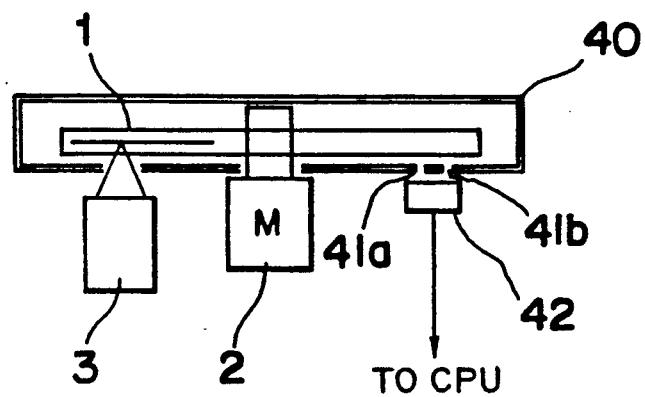
Fig. 7

INFORMATION RECORDING AND REPRODUCING APPARATUS

BACKGROUND OF THE INVENTION

1. Field of the Invention

The present invention relates generally to an information recording and reproducing apparatus for successively recording and reproducing information, and more particularly, an information recording and reproducing apparatus capable of emulating a rewritable optical disc as an optical disc of the type in which recording is permitted only one time and reading is permitted many times, but no rewriting is permitted.

2. Description of the Prior Art

It is generally known that an optical disc can have information recorded thereon in a high recording density which may be about 10 or more times that recordable on a magnetic disc. The high recording density primarily owes to the high converging characteristic of a laser beam and tracks narrowed in pitch.

An optical disc called "WORM" (write-once read-many type) has a useful life longer than 10 years and is characterized in that recording is permitted only one time and reading is permitted many times, but no rewriting is permitted in principle.

The recent technical progress of optical disc media makes it possible to put to practical use media in which rewriting of data is permitted as similar to magnetic media. Magneto-optical disc media, phase change type rewritable media, and the like are in practical use as such optical disc media. Nowadays, environmental characteristics required to store the optical disc media are remarkably improved, as compared with those for magnetic tapes. Furthermore, by the use of an ordinary rewritable optical disc and a drive therefor, emulation of a "WORM" operation is performed in which recording is permitted only one time and reading is permitted many times.

In order to impart a "WORM" function to the optical disc and the drive therefor, "WORM" (information) indicating that the optical disc is a "WORM" disc is pre-recorded as bits on control tracks whereas the disc drive is made to perform a "WORM" recording operation based upon the "WORM" information recorded on the control tracks such that data recording is permitted on unrecorded sectors but prohibited on recorded sectors.

Since the rewritable optical disc and a "WORM" emulated optical disc originate from the same recording medium, it is only necessary to add to the disc drive a function required for handling the "WORM" information and that required for emulating the "WORM" operation. Accordingly, the disc drive can be considerably simplified, as compared with the case where the same disc drive is used for recording on and reproducing from the ordinary rewritable optical discs and the "WORM" optical discs which are different from each other in optical characteristics and recording principles.

In an information recording and reproducing apparatus employing the conventional "WORM" optical discs, data recording is performed on unrecorded sectors by modulating a laser beam emitted from an optical head at a strong recording power while the laser beam is being focused on a desired track. In data reproducing, a considerably weak laser beam is initially applied to the optical disc, and upon receipt of a light reflected therefrom, a reproducing signal is generated and then demodulated In the "WORM" optical disc, since the data recording is permitted a single time, it is necessary to record data on the unrecorded sectors successively from the beginning of a track. In the data reproducing, it is important to find out the end of recorded sectors from the viewpoint of high speed handling of file management information such as the so-called directory with the reasoning that the newest data exist on sectors to which latest recording has been performed.

FIG. 1 depicts an arrangement of data in a conventional "WORM" optical disc 33. The optical disc 33 stores data 34 of recorded files and a directory 35 for controlling address information of sectors on which the data 34 have been recorded, and includes an unrecorded region 36. The data 34 and the directory 35 are successively additionally recorded on the unrecorded region 36 from the outermost and innermost portions towards a medial portion of the optical disc 33 in the direction shown by arrows X and Y, respectively.

How to record data will be discussed hereinafter taking the case where data (b) are additionally recorded on the optical disc 33.

(1) A disc drive checks the presence or absence of envelopes of recording signals from the beginning of the directory 35 in order to detect a first sector S2 having no envelope. As a result, the latest directory DIRa is found out from a sector S1 immediately ahead of the sector S2.

(2) From the directory DIRa, a last sector S3 can be known on which the end of the data 34 has been recorded. The data (b) are then recorded from a sector S4 to a sector S5.

(3) The disc drive adds address information of the recorded data (b) (from the sector S4 to the sector S5) to the information of the directory DIRa and records a new directory DIRb from the sector S2.

A "WORM" optical disc can be emulated in the above-described manner.

However, since data must be recorded on the unrecorded sectors, it is always necessary to find out the position of the unrecorded sectors at the time of disc replacement. Furthermore, when the track density is made higher to raise the recording capacity, the use of the detection of the envelopes of the recording signals makes it difficult to correctly find out the latest recorded sector. This is primarily due to a crosstalk between tracks. A crosstalk signal occasionally leaks out of a recorded sector to an adjoining unrecorded sector and an envelope thereof is subsequently undesirably detected.

SUMMARY OF THE INVENTION

The present invention has been developed to overcome the above-described disadvantages.

It is accordingly an object of the present invention to provide an improved information recording and reproducing apparatus capable of correctly finding out the position of the end of recorded sectors or the first unrecorded sector at a high speed.

In accomplishing this and other objects, an information recording and reproducing apparatus according to the present invention includes a rewritable optical disc having a plurality of sectors on which data can be rewritten. The rewritable optical disc is divided into an additionally recordable region in which the data are additionally recorded and a rewritable disc control region in which an address of a latest recorded sector in the additionally recordable region is recorded. The optical disc is used as an additionally recordable optical disc in which recording is permitted only one time and reproduction can be performed plural times, like a "WORM" disc.

The information recording and reproducing apparatus further includes an additionally recording and reproducing means for recording data on unrecorded sectors in the additionally recordable region and for reading the data from recorded sectors and a rewriting and reproducing means for rewriting and reproducing data in the disc control region.

The rewriting and reproducing means reads the disc control region prior to additional recording of data, thereby finding a first unrecorded sector from the address of the latest recorded sector recorded in the disc control region. The additionally recording and reproducing means records data on unrecorded sectors following the first unrecorded sector, and upon termination of data recording, the rewriting and reproducing means rewrites the address of the latest recorded sector in the disc control region.

In this way, a "WORM" recording operation is emulated by the use of a rewritable optical disc. As a result, a latest recorded sector or a first unrecorded sector can be detected at a high speed.

BRIEF DESCRIPTION OF THE DRAWINGS

This and other objects and features of the present invention will become more apparent from the following description taken in conjunction with the preferred embodiment thereof with reference to the accompanying drawings, throughout which like parts are designated by like reference numerals, and wherein:

FIG. 4 is a schematic view of a reproduction control track provided in the optical disc of FIG. 3;

FIG. 5 is a schematic view of a disc control track provided in the optical disc of FIG. 3;

FIG. 7 is a schematic view of a cartridge accommodating the optical disc and having two identification holes for indicating the type of the optical disc.

DETAILED DESCRIPTION OF THE PREFERRED EMBODIMENTS

Figure 2:
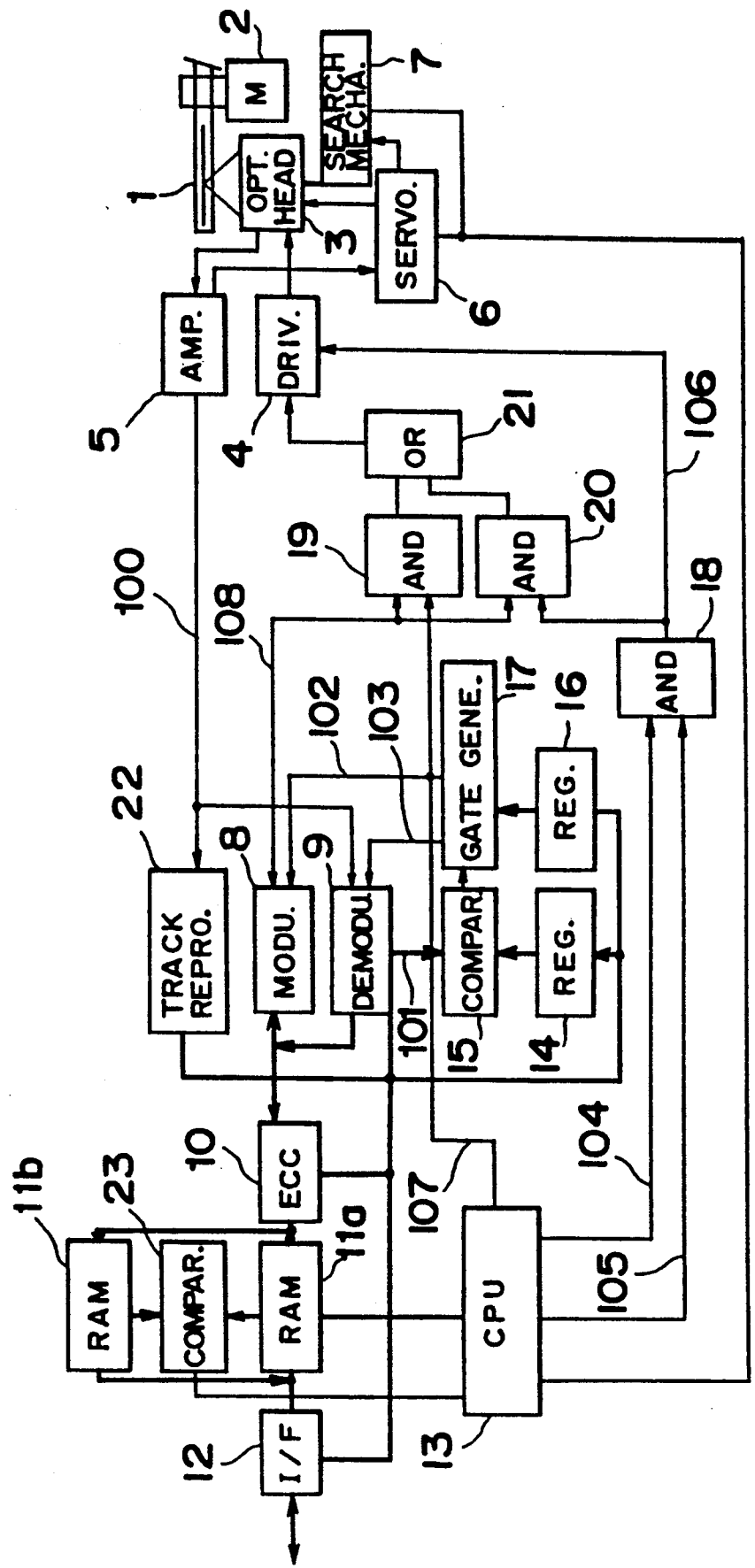
FIG. 2 is a block diagram of an information recording and reproducing apparatus according to the present invention.

Referring now to the drawings, there is shown in FIG. 2 a block diagram of an information recording and reproducing apparatus embodying the present invention.

As shown in FIG. 2, the information recording and reproducing apparatus according to the present invention comprises an optical disc 1 for recording information thereon, a spindle motor 2 for rotating the optical disc 1, and an optical head 3 for focusing and tracking a laser beam on a track of the optical disc 1 to record signals. In reproducing, a laser beam is again applied to the optical disc 1 and the information recorded thereon is read by a reflected light therefrom. A laser provided in the optical head 3 is modulated by a laser driving circuit 4. Servo-error signals and reproducing signals from the optical head 3 are detected by a head amplifier circuit 5. A track search mechanism 7 makes the optical head 3 access to a desired track of the optical disc 1 and comprises, for example, a linear motor, and a light beam from the optical head 3 is focused for tracking on the track by a servo-circuit 6. A data modulator 8 effects a digital-modulation with respect to inputted data whereas a data demodulator 9 effects a demodulation with respect to reproducing signals from the head amplifier circuit 5. An error correction circuit 10 is provided for encoding error correction codes and for performing an error correction. A RAM 11a and a RAM 11b store data recorded and data read out, respectively. A system interface circuit 12 electrically connects a host system and an optical disc drive with each other and comprises, for example, an SCSI (Small Computer System Interface). The entire disc drive system is controlled by a CPU 13.

Reference numerals 14 and 15 denote a register for setting a target address required to record and reproduce data and an address comparator for performing a coincidence comparison between an address signal 101 and the target address set by the register 14, respectively. A reproducing signal 100 from the optical disc 1 is reproduced as the address signal 101 by the data demodulator 9. Reference numerals 16 and 17 denote a register for storing a read command from the CPU 13 and a gate signal generating circuit for generating a write gate signal 102 and a read gate signal 103, respectively. The write gate signal 102 initiates a data recording at the timing the address comparator 15 outputs a coincidence signal indicative of the coincidence between the address signal 101 and the target address whereas the read gate signal 103 initiates a data readout. An AND gate 18 is provided for taking a logic AND between a disc signal 104 indicating whether a "WORM" region is designated and an unrecorded sector signal 105 indicating an unrecorded sector of a track to which the optical head 3 accesses. The AND gate 18 outputs an additional recording signal 106 when additional recording is permitted on this sector. An AND gate 19 is provided for taking a logic AND between a data modulation signal 108 and a rewriting signal 107 indicating that the track to which the optical head 3 accesses is a disc control region. The AND gate 19 outputs a data renewal signal for permitting data renewal on the disc control region. An AND gate 20 takes a logic AND between the additional recording signal 106 and the data modulation signal 108 to record data on an unrecorded sector. The signal outputted from the AND gate 19 and that outputted from the AND gate 20 are both inputted into and ORed in an OR gate 21 to be applied to the laser driving circuit 4. A control track reproducing circuit 22 is provided for reading a control track of the optical disc 1. A data coincidence comparator 23 performs a read verification by comparing the recording data stored in the RAM 11a and the reproducing data read out from the recording sectors and stored in the RAM 11b with each other to confirm the coincidence therebetween.

Figure 1:
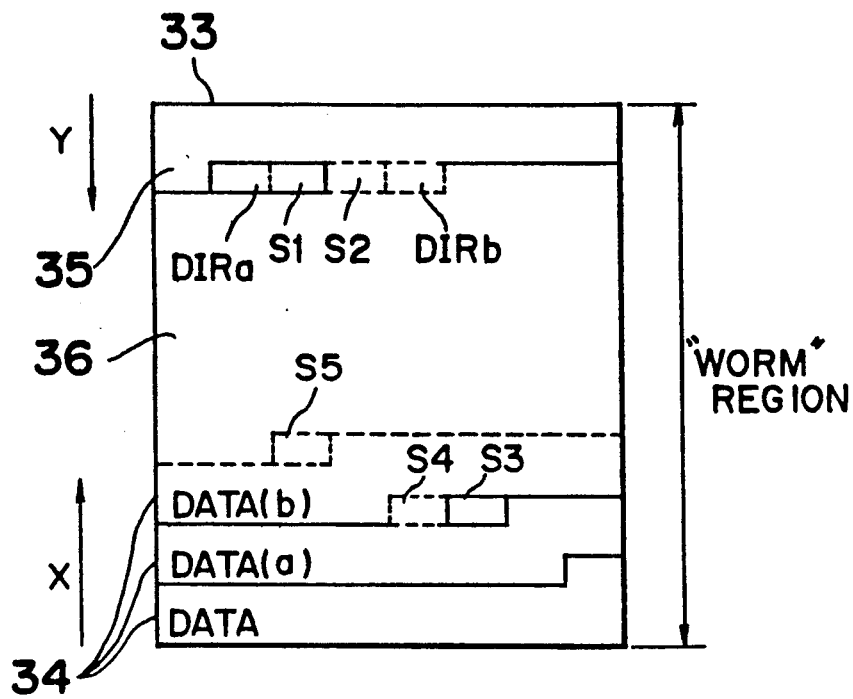
FIG. 1 is a schematic view of a data arrangement in a conventional "WORM" optical disc.
Figure 3:
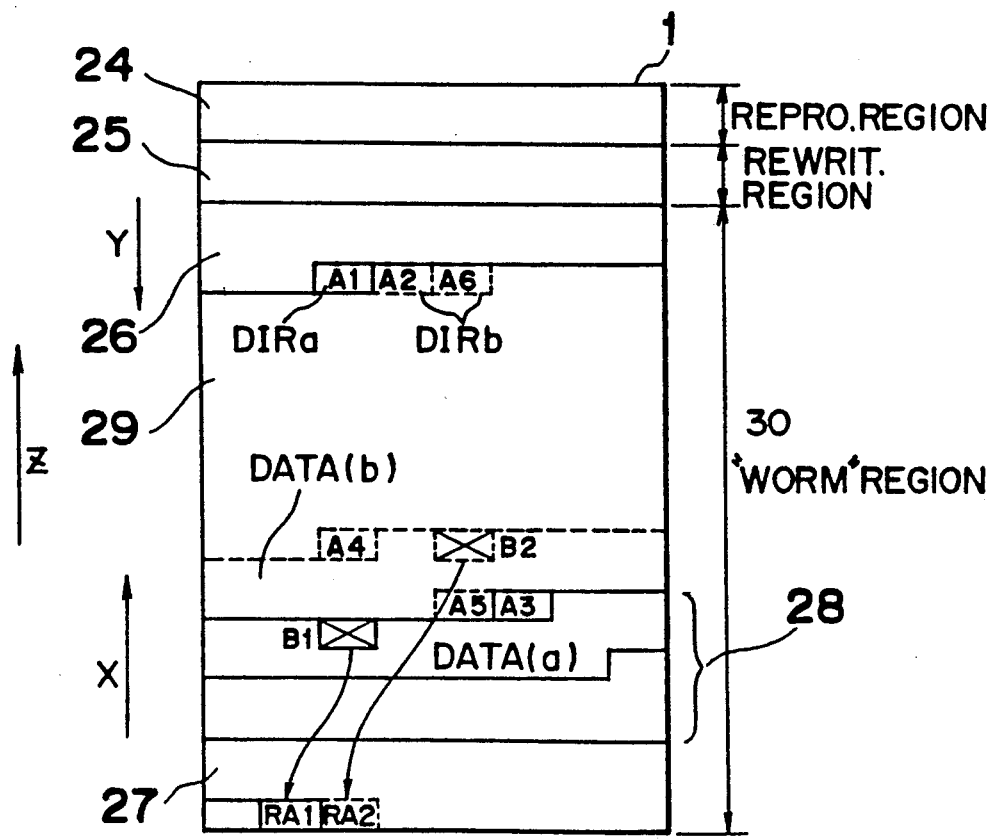
FIG. 3 is a schematic view of a track arrangement of an optical disc according to the present invention.

FIG. 3 depicts an arrangement of tracks in the optical disc 1.

The optical disc 1 includes a reproduction control track 24 and a disc control track 25 as a rewritable region. The reproduction control track 24 is a region to be exclusively used for reproduction, on which disc information indicating whether the disc has been designated as a "WORM" disc and physical format information are recorded in the form of pits as its format in a factory. Address information of the end of recorded sectors in an additionally recordable region is recorded on the disc control track 25. The optical disc 1 further includes a directory 26 in which file control information is recorded, a defective sector substitute region 27 for substituting for defective sectors, a data region 28 on which data have been recorded, and an unrecorded region 29 having no data. The directory 26, the defective sector substitute region 27, the data region 28, and the unrecorded region 29 constitute an additionally recordable region 30.

Let it be assumed that data (a) have already been recorded on the data region 28 and data (b) are recorded now. File control of the optical disc 1 is performed by the use of a directory DIRa under the conditions in which the data (a) have been recorded and a directory DIRb after the data (b) have been recorded. The optical disc 1 shown in FIG. 3 includes defective sectors B1 and B2, for which are substituted sectors RA1 and RA2, respectively.

FIG. 4 depicts an example of the reproduction control track 24 on which are recorded disc information 31 indicating whether the optical disc 1 made of a rewritable medium is a "WORM" disc or a rewritable disc and physical parameters including the speed of the optical disc 1, the type of modulation, and the like.

If a "WORM" disc is designated as the disc information, the optical disc 1 emulates a "WORM" medium, though it is a rewritable disc.

FIG. 5 depicts one example of the disc control track 25, which is divided into n sectors from a sector S1 to a sector Sn in units of one sector. Disc control information 32 is recorded in each of these sectors S1-Sn.

Upon recording the data (a), an address A1 of the latest recorded sector in the directory 26, an address A3 of the latest recorded sector in the data region 28, and an address RA1 of the latest recorded sector in the defective sector substitute region 27 are recorded as the disc control information 32. Each address consists of a track address and a sector address.

The disc control information 32 is not always required to include all of the above addresses A1, A3 and RA1 but is required to include at least the address A1 of the latest recorded sector in the directory 26. If at least this address A1 is recorded, the address A3 of the latest recorded sector in the data region 28 and the address RA1 of the latest recorded sector in the defective sector substitute region 27 can be known from the directory.

Since the disc control track 25 functions as a rewritable region, it is rewritten whenever new information is additionally recorded on the data region 28 and the directory 26.

The provision of the rewritable disc control region enables the high speed detection of unrecorded sectors because the last address of recorded sectors is always recorded therein. According to this method, the latest recorded sector can directly be known as compared with the conventional method in which, whenever a "WORM" disc is replaced by another, an unrecorded sector immediately after recorded sectors is searched for by successively reproducing sectors from the beginning of the disc. Accordingly, the method according to the present invention can provide a high speed processing. In particular, the more data are recorded on the optical disc, the greater effect can be obtained. This method of detecting unrecorded sectors is a method most suitable for a large capacity optical disc.

Figure 6:
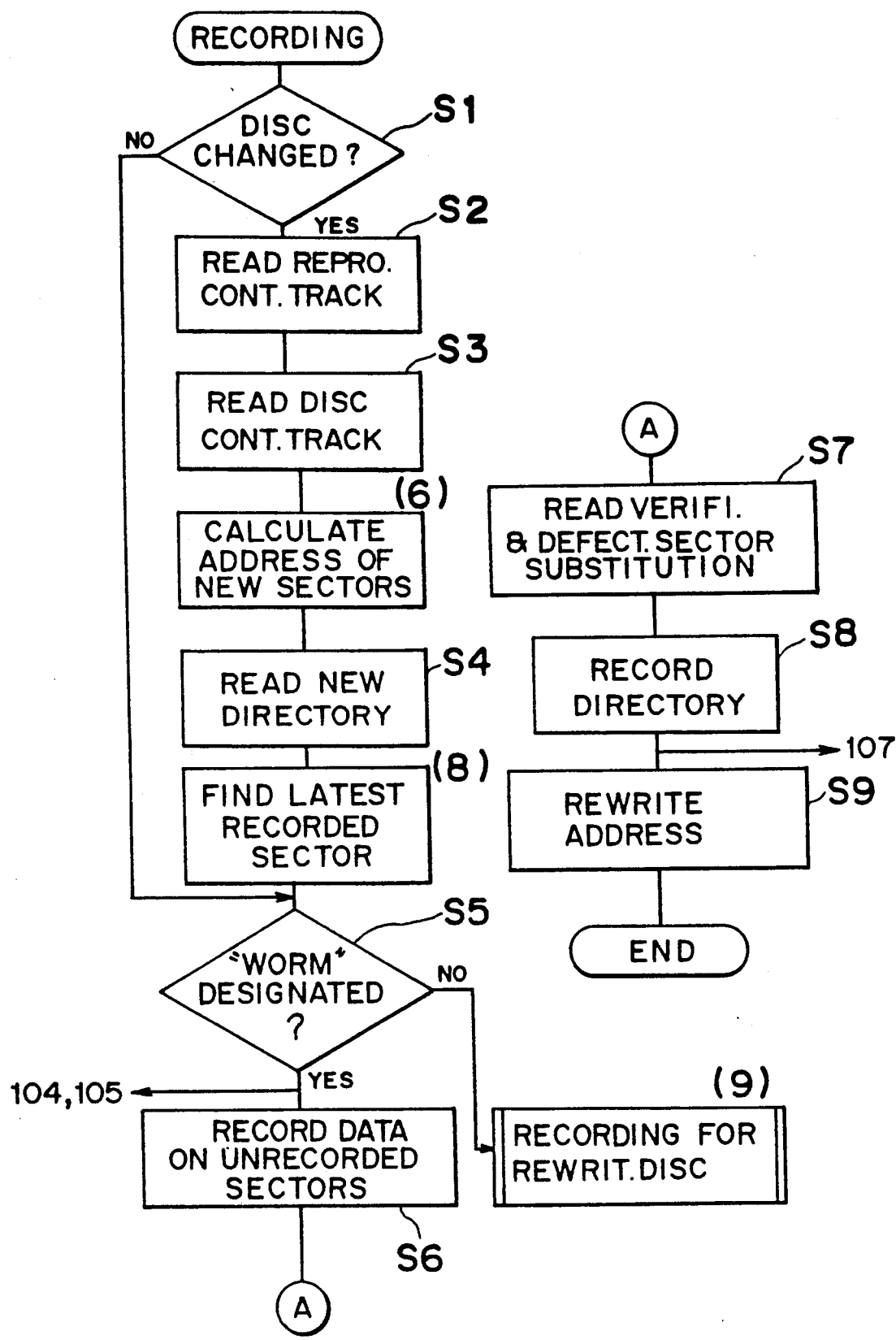
FIG. 6 is a flowchart indicative of a data recording operation.

The operation of the information recording and reproducing apparatus having the above-described construction will be discussed hereinafter with reference to a flowchart shown in FIG. 6.

Let it be assumed that the data (a) have been recorded on the optical disc 1 and the directory DIRa corresponding thereto has been produced, as shown in FIG. 3, and that the data (b) are additionally recorded on the optical disc 1.

Check of Replacement of Optical Discs (Step S1)

(1) When an optical disc 1 is replaced by another, the CPU 13 rotates the motor 2 and outputs a command to the servo-circuit 6 so that a laser beam from the optical head 3 may be focused for tracking on a track of the optical disc 1.

(2) In contrast, when no replacement is performed, the procedure proceeds to step S5.

Readout of Reproduction Control Track (Step S2)

(3) The CPU 13 commands the track search mechanism 7 to seek the reproduction control track 24. When the track search mechanism 7 has accessed to the reproduction control track 24, the disc information is read out from the control track reproducing circuit 22.

Readout of Disc Control Track (Step S3)

(4) The CPU 13 commands the track search mechanism 7 to search the disc control track 25.

(5) When the track search mechanism 7 has accessed to the target track 25, the CPU 13 reads the disc control information recorded on the disc control track 25.

More specifically, the CPU 13 sets the address of a read sector and a read command to the registers 14 and 16, respectively. Upon rotation of the optical disc 1, when the target sector is detected by the address coincidence circuit 15, the gate signal generating circuit 17 outputs a read gate signal 103, which is in turn inputted into the data demodulator 9 to initiate a data demodulation. Upon correction of errors in the error correction circuit 10, data are stored in the RAM 11b. The CPU 13 reads address information of the latest recorded sectors from the RAM 11b and knows the addresses A1, A3 and RA1 of the latest recorded sectors in the directory DIRa, the data region 28, and the defective sector substitute region 27, respectively.

(6) Based on these addresses A1, A3 and RA1, the CPU 13 calculates the addresses A2, A5 and RA2 of unrecorded sectors on which subsequent recording is performed. In the case where the address ascending is performed in the direction shown by an arrow Z, the addresses A2, A5 and RA2 are obtained as follows:

$$A2 = A1 - 1,$$

$$A5 = A3 + 1, \text{ and}$$

$$RA2 = RA1 + 1.$$

Readout of Directory (Step S4)

(7) The CPU 13 searches for the address A1 of the latest recorded sector in the directory region obtained at the above (6) and reads the directory DIRa in the same manner as (6) to transfer it to a host system or host CPU.

(8) The CPU 13 knows the position of recorded data from the contents of the directory DIRa. In other words, the CPU 13 recognizes that the data (b) are the latest data and the address of the latest recorded sector is A3.

Check of Designation of "WORM" Disc (Step S5)

(9) Step S5 determines whether the optical disc 1 has been designated as a "WORM" disc. If the optical disc 1 has not been designated as a "WORM" disc, a data recording processing for an ordinary rewritable disc is performed with respect thereto.

(10) In contrast, if the optical disc 1 has been designated as a "WORM" disc, a recording operation for the "WORM" disc is performed which will be discussed hereinafter.

Recording of Data on Unrecorded Sectors (Step S6)

(11) The CPU 13 requests the host system or host CPU to transfer data thereto. The data transferred are stored in the RAM 11a via the interface circuit 12. The CPU 13 outputs the unrecorded sector signal 105 and the additionally recording signal 104 to the AND gate circuit 18 to permit recording only on unrecorded sectors of the optical disc 1.

(12) The CPU 13 sets to the register 14 the unrecorded sector A5 immediately after the address A3 of the latest recorded sector. The CPU 12 also sets a write command to the register 16. Upon rotation of the optical disc 1, when the target sector is detected by the address coincidence circuit 15, a write gate signal 102 is inputted into the data modulator 8 from the gate generating circuit 17. The error correction circuit 10 adds error correction codes to the data, which are in turn modulated by the data modulator 8. The modulation signal 108 produced in this way is then inputted into the laser driving circuit 4 via the AND gate 20 and the OR gate 21 to modulate the intensity of a laser of the optical head 3 so that the data may be recorded on the optical disc 1.

Furthermore, the CPU 13 alters a value of address and sets it to the register 14 again. The CPU 13 also records the given data as far as the sector A4 while searching tracks as occasion demands.

Read Verification and Defective Sector Substitution (Step S7)

(13) During the recording operation at step S6, the CPU 13 performs a read verification with respect to the recorded sectors in units of one or several sectors. As described previously in (5), the data are reproduced from the recorded sectors and stored in the RAM 11b. At this time, the error correction circuit 10 performs no error correction.

The CPU 13 causes the data coincidence comparator 23 to compare the recording data stored in the RAM 11a and the reproducing data stored in the RAM 11b with each other and counts the number of errors of the data. If the number of errors exceeds a reference value, the sector B2 is regarded as a defective sector and the sector RA2 in the defective sector substitute region 27 is substituted therefor. In a substitute recording, the data in the RAM 11a are recorded on the sector RA2 in the same manner as step S6. (The read verification may be performed in such a manner that upon correction of errors by the error correction circuit 10, the quality of the recorded sectors is checked by detecting the number of errors.)

Recording of Directory (Step S8)

(14) Upon termination of the data recording, the CPU 13 adds to the file control information DIRa the address information of the sectors on which the data (b) have been recorded. This address information is recorded from the sector A2 to the sector A6 as a new directory DIRb. As occasion demands, the read verification and the defective sector substitution are performed in the same manner as step S7.

Rewriting of Disc Control Information (Step S9)

(15) The CPU 13 renews the contents 32 of the disc control track 25 i.e., the address information of the latest recorded sectors in the directory region 26, the data region 28 and the defective sector substitute region 27, as shown in FIG. 5. More specifically, the addresses (A1), (A3) and (RA1) are rewritten to (A6), (A4) and (RA2), respectively.

After the CPU 13 has searched the disc control track 25, it makes the rewriting signal 107 valid and sets the sector address S1 of the disc control track 25 to the register 14. The CPU 13 also sets a write command to the register 16. Upon rotation of the optical disc 1, when the target sector is detected by the address coincidence circuit 15, the write gate signal 102 is inputted from the gate generating circuit 17 into the data modulator 8. The disc control information to which the error correction codes have been added by the error correction circuit 10 is modulated by the data modulator 8. The modulated signal is inputted into the laser driving circuit 4 via the AND gate 19 and the OR gate 21 and is recorded by the optical head 3. Furthermore, the CPU 13 alters the address value to be set to the register 14 from S1 to S2 and then to S3 so that the recording may be performed plural times. In this way, the rewritable disc control track 25 is rewritten.

It is to be noted here that in the above-described embodiment, although the file management including the directory management is performed by the CPU 13, the directory may be controlled by a host CPU. The processing in this case is the same as that of the above-described embodiment except that the readout and recording of the directory and the data transfer are conducted via the interface circuit 12.

It is also to be noted that in the above-described embodiment, although the designation of the "WORM type" is recorded on the control track 24, a cartridge accommodating the optical disc may be provided with an identification hole or holes for identifying the mode of use of the optical disc.

As shown in FIG. 7, for example, the type of an optical disc can be designated by detecting the state of two identification holes 41a and 41b formed in a lower wall of a cartridge 40 using any suitable detector means 42 opposed to the identification holes 41a and 41b.

Table 1 indicates that the type of an optical disc can be designated by the two identification holes 41a and 41b.

TABLE 1

| Type of Disc | Hole 41a | Hole 41b |
| --- | --- | --- |
| Rewritable Type | open | open |
| Designation of "WORM" Type in Rewritable Disc | close | open |
| "WORM" Type | open | close |
| Reproduction Type | close | close |

In Table 1, when both the identification holes 41a and 41b are opened, a disc accommodated in the cartridge 40 is regarded as a rewritable disc. From Table 1, it is possible to identify the type of any other discs.

As is clear from the above, according to the present invention, since the latest recorded sectors in an optical disc or the first unrecorded sectors immediately after the recorded sectors can rapidly be detected, a write processing for a file can be performed at a high speed. In particular, the present invention exhibits a greater effect with the increase of data recorded on the optical disc and provides a method of detecting unrecorded sectors which is suitable for a large capacity optical disc.

In addition, the present invention is free from the problem of a crosstalk between adjoining tracks, which occasionally occurs when unrecorded sectors immediately after recorded sectors are detected using envelopes of respective recording signals. Accordingly, the present invention can readily narrow tracks in an optical disc.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. An information recording and reproducing apparatus comprising:
    a rewritable optical disc having a plurality of sectors on which data can be rewritten and being divided into an additionally recordable region in which the data are additionally recorded and a rewritable disc control region in which an address of a latest recorded sector in the additionally recordable region is recorded, said rewritable optical disc being used as an additionally recordable optical disc in which recording is permitted only one time and reproduction can be performed plural times;
    an additionally recording and reproducing means for recording data on unrecorded sectors in said additionally recordable region and for reading the data from recorded sectors; and
    a rewriting and reproducing means for rewriting and reproducing data in said disc control region,
    whereby said rewriting and reproducing means reads said disc control region prior to additional recording of data, thereby finding a first unrecorded sector from the address of said latest recorded sector recorded in said disc control region, and whereby said additionally recording and reproducing means records data on unrecorded sectors following said first unrecorded sector, and upon termination of data recording, said rewriting and reproducing means rewrites the address of said latest recorded sector in said disc control region.

2. The apparatus according to claim 1, further comprising a control track reproducing means for reading a control track on which said optical disc is designated as an additionally recordable disc.

3. The apparatus according to claim 2, wherein based upon disc information sent from said control track reproducing means and the address of said latest recorded sector read by said rewriting and reproducing means, said additionally recording and reproducing means permits the additional recording on the unrecorded sectors immediately after said latest recorded sector, thereby preventing the recording on the recorded sectors.

4. The apparatus according to claim 1, further comprising a cartridge accommodating said optical disc and having at least one identification hole formed therein and a detector means opposed to said identification hole for detecting a type of said optical disc, said identification hole indicating that said optical disc has been designated as an additionally recordable disc.

5. The apparatus according to claim 4, wherein based upon information from said detector means and the address of said latest recorded sector read by said rewriting and reproducing means, said additionally recording and reproducing means permits the additional recording on the unrecorded sectors immediately after said latest recorded sector, thereby preventing the recording on the recorded sectors.

6. The apparatus according to claim 1, further comprising a verification means for verifying that data recording has normally been performed on unrecorded sectors in a data region and a substitution means for substituting a sector in a defective sector substitute region for a defective sector in said data region, and wherein when said verification means detects a defective sector in the sectors recorded by said additionally recording and reproducing means, said substitution means substitutes a sector in said defective sector substitute region for said defective sector and wherein said rewriting and reproducing means records in said disc control region an address of a latest recorded sector in said data region and an address of a latest recorded sector in said defective sector substitute region.

7. The apparatus according to claim 2, further comprising a verification means for verifying that data recording has normally been performed on unrecorded sectors in a data region and a substitution means for substituting a sector in a defective sector substitute region for a defective sector in said data region, and wherein when said verification means detects a defective sector in the sectors recorded by said additionally recording and reproducing means, said substitution means substitutes a sector in said defective sector substitute region for said defective sector and wherein said rewriting and reproducing means records in said disc control region an address of a latest recorded sector in said data region and an address of a latest recorded sector in said defective sector substitute region.

8. The apparatus according to claim 4, further comprising a verification means for verifying that data recording has normally been performed on unrecorded sectors in a data region and a substitution means for substituting a sector in a defective sector substitute region for a defective sector in said data region, and wherein when said verification means detects a defective sector in the sectors recorded by said additionally recording and reproducing means, said substitution means substitutes a sector in said defective sector substitute region for said defective sector and wherein said rewriting and reproducing means records in said disc control region an address of a latest recorded sector in said data region and an address of a latest recorded sector in said defective sector substitute region.

* * * * *